United States Patent [19]

Conkey

[11] 4,036,123

[45] July 19, 1977

[54] MACHINE OF CUTTING CORES OF VEGETABLES

[75] Inventor: James Elliott Conkey, Seneca Falls, N.Y.

[73] Assignee: Kibbey Machine Company, Incorporated, Seneca Falls, N.Y.

[21] Appl. No.: 609,032

[22] Filed: Aug. 29, 1975

[51] Int. Cl.² .................. A23N 23/00; A23N 4/12; A47J 23/00; A47J 25/00

[52] U.S. Cl. ................................ 99/538; 99/547

[58] Field of Search .......... 99/547, 548, 559, 560, 99/538, 544, 545, 549, 565

[56] References Cited

U.S. PATENT DOCUMENTS

| | | | |
|---|---|---|---|
| 1,766,824 | 6/1930 | Jones | 99/547 X |
| 2,092,956 | 9/1937 | Connor et al. | 99/548 |
| 2,681,088 | 6/1954 | Krupp et al. | 99/548 X |
| 3,612,124 | 10/1971 | Cunningham et al. | 99/547 X |

FOREIGN PATENT DOCUMENTS 368,826  5/1919  Germany .......................... 99/559

*Primary Examiner*—Harvey C. Hornsby
*Assistant Examiner*—Robert Pous
*Attorney, Agent, or Firm*—Cumpston & Shaw

[57] ABSTRACT

This invention relates to an apparatus for cutting the core of a leafy vegetable, such as a cabbage, prior to the cabbage being sliced for making sauerkraut and the like.

The machine comprises a frame having endless belt conveying means for carrying the cabbage heads to a coring station. At the coring station, vertically-reciprocating, non-rotating knives engage the core and cut it into sections. The downward or cutting movement of the knives is terminated by adjustable means which cause the knives to be returned to their normal at-rest positions out of engagement with the cabbage.

3 Claims, 4 Drawing Figures

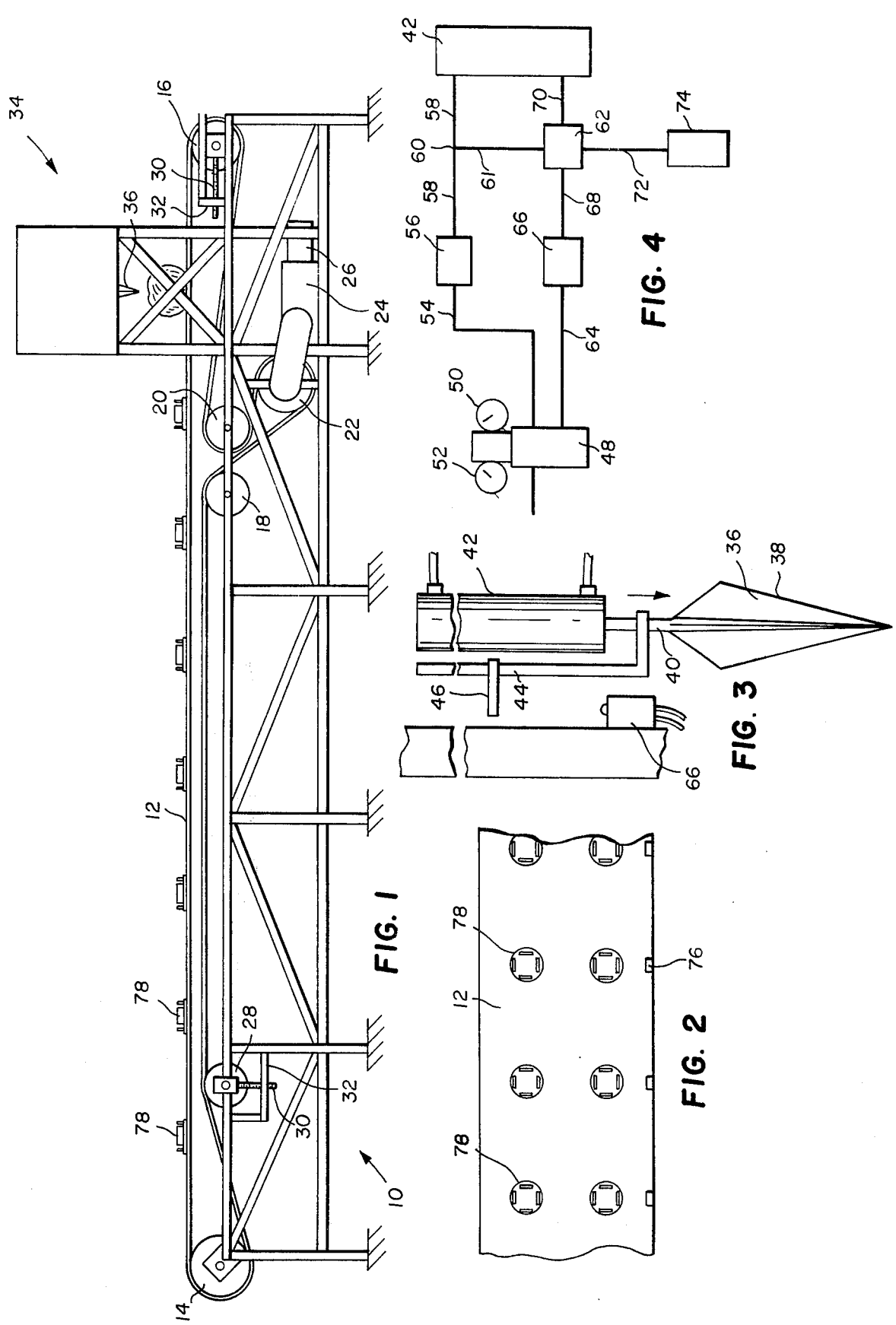

MACHINE OF CUTTING CORES OF VEGETABLES

BACKGROUND OF THE INVENTION

Machines for removing the cores from leafy vegetables, such as cabbages, prior to the cabbage being made into sauerkraut have heretofore been made utilizing rotating knives or cutters that remove the cores. Such rotating cutters are dangerous, and the removal of the core reduces the amount of cabbage available for sauerkraut. As the cores have no substantial separate use, this results in considerable waste in the sauerkrauting operation.

The present invention recognizing the danger of the rotating core removing devices and the wasteful nature of such operation, eliminates the use of rotating cutters, and at the same time saves the material forming the core and allows this to be used in the manufacture of sauerkraut, thereby increasing the production for a given number of heads of cabbage and decreasing the expense of making sauerkraut. To this end, the present invention comprises a machine having a plurality of reciprocating, non-rotating cutters each of which comprises a plurality of cutting edges. The cabbages are placed on a conveying means that carries them beneath the reciprocating cutters. When the cabbages are in proper position, the cutters are moved into the core portions of the cabbages, neatly cutting the same. The cutters then retract, and the cabbages move on to a discharge point, where they are then transferred to a conventional slicing machine wherein the heads are sliced at substantially right angles to the longitudinal axis of the core, and all portions of the cabbage, including the core, are available for use in making sauerkraut.

SUMMARY OF THE INVENTION

The present invention comprises a frame having a conveying means, such as an endless belt mounted thereon for carrying the cabbages or other vegetables from a feed end to a discharge end. A coring station is located along the route of the conveying means, and when the cabbages reach the coring station, cutting means are caused to engage the cores of the cabbages to cut them. Thereafter, the cabbages are discharged from the machine and transferred to the slicing machines of known construction.

BRIEF DESCRIPTION OF THE DRAWINGS

FIG. 1 comprises a side elevational view of a machine for cutting cores of cabbages and the like embodying the present invention;

FIG. 2 is a fragmentary top plan view of the machine of FIG. 1;

FIG. 3 is an end elevational view of the coring station with the cover removed showing the cutters and mechanism for moving the same; and FIG. 4 is a schematic view of the fluid lines and associated valve and gauge means for actuating the cutters.

As shown in FIG. 1, the machine comprises an elongated rectangular frame 10 having an elongated conveyer means 12, such as an endless belt of neoprene or other suitable material. Belt 12 is mounted on suitable pulleys or rollers, including pulley 14 at the feed end of the machine, a similar pulley 16 at the discharge end, fixed idler pulleys 18 and 20 located on the lower flight of the belt and a drive pulley 22. Pulley 22 is connected to a speed reducer 24 which in turn is actuated by an electric motor 26. Discharge pulley 16 is preferably mounted for movement longitudinally along the table to maintain the belt 12 at the desired tension. An additional adjustable pulley or roller assembly 28 is provided adjacent the feed on the lower flight of the belt for providing additional means for compensating for belt wear and stretching and to keep the belt under the desired tension. The adjusting mechanism for rollers 16 and 28 are of known construction, form no part of the present invention, and comprise essentially a pair of journals for supporting the ends of the respective pulley shafts, threaded support rods 30 which engage threaded members (not shown) mounted on fixed supporting bases 32.

Located near the discharge end of the machine is a coring station shown generally at 34. Within coring station 34 are two vertically movable cutters 36, each of which preferably comprises three equi-spaced cutting blades 38. Each blade is formed with two cutting edges. Cutters 36 are mounted on the lower ends of piston rods 40, which in turn are caused to move vertically by fluid actuated cylinders 42. Although cylinders 42 may be actuated by any suitable fluid, such as air, inert gas, oil or the like, preferably they are air actuated. This allows for a simpler circuitry in that the discharge from the cylinders may be vented to the atmosphere without the need for recovering the fluid. Attached to one of piston rods 40 in an L-shaped member 44 that carries at right angles thereto an adjustable stop lever or bar 46 for purposes hereafter described.

The means for controlling the flow of fluid pressure to and from cylinders 42 comprises a supply of fluid pressure, not shown, which is connected to a regulator 48. A gauge 50 registers the pressure of the incoming fluid, while a gauge 52 registers the pressure of the exhaust fluid. The fluid control circuitry is the same for both the cylinders 42, although for purposes of brevity, the circuit for only one cylinder is shown and described. From regulator 48, a pressure line 54 leads to a switch or valve 56, which controls the downward movement of piston and attached cutter. From this valve 56, a line 58 leads to the upper end of cylinder 42 for causing the downward movement of piston rod 40 and associated cutter. A Tee connection 60 located in line 58 is connected to an air switch 62 for purposes hereafter described. A second pressure line 64 leads from regulator 50 to a second switch or valve 66. Valve 66 controls the upward movement of the piston rod 40 and associated cutter. From valve 66, a pressure line 68 leads to air switch 62. From air switch 62, an additional pressure line leads to the lower end of cylinder 42 for admitting fluid at the lower end to cause the piston rod 40 to move upwardly. A line 72 leads from air switch 62 to an exhaust muffler 74.

In operation, cylinder 42 is actuated as follows. When a head of cabbage is in proper position at the coring station and directly below an appropriate cutter, valve 56 is closed, thereby allowing high pressure fluid to enter the upper end of cylinder 42 and drive piston rod 40 and associated cutter downwardly into the core of the cabbage located below. At the same time high pressure fluid is flowing to the upper end of cylinder 42, it is also flowing into air switch 62 through Tee 60 and line 61. Air switch 62 is so designed that the admission of high pressure air through line 61 causes switch 62 to connect line 70 from the lower end of cylinder 42 to exhaust muffler 74 through line 72. This vents the lower end of the cylinder and allows the piston to move downwardly under the force of the high pressure fluid admitted at the upper end of the cylinder through line 58.

When piston rod 40 and associated cutter 36 have reached the end of their pre-determined stroke, adjustable stop 46 (FIG. 2) engages and actuates the switch 66. Switch 66 closes and allows high pressure fluid to flow into air switch 62 through line 68. The presence of high pressure air reaching switch 62 via line 68 causes switch 62 to connect line 61 and thus the upper end of the cylinder to line 72 and exhaust muffler 74. At the same time, switch 62 allows high pressure air to flow from line 68 to line 70 and into the lower end of cylinder 42 for raising piston rod 40 and its associated cutter 36. Since it is not necessary to stop the conveyor during the cutting operation, the movement of the conveyor during the short period of time that it takes for cutter 36 to descend into the core of the cabbage deactivates or opens switch 56 thereby terminating the supply of high pressure fluid through line 58.

Switch 56, which controls the downward movement of the piston rod 40, is actuated by suitable cam or trigger means 76 located on the upper surface of belt 12. These cam means are so positioned that they will engage switch 56 and close the same when the cabbage is in the proper position beneath cutters 36. Thus, it will be seen that as each head of cabbage moves into position at the coring station, switch 56 is closed causing the cutter to move downwardly into cutting engagement with the core of the cabbage. When cutter 36 reaches the end of its cutting stroke, as determined by the position of adjustable stop 46, "up" valve 66 is actuated by stop 46 and the flow of high pressure fluid to cylinder 42 is reversed thereby raising piston rod 40 and its associated cutter. Since the cores do not extend through the cabbages, the cutters move only part way into the cabbages and do not pass through the lower surfaces of the cabbages. The cutters are adjusted to penetrate the cabbages sufficiently to cut the cores thereof without separating the cabbages into discrete portions.

It will be appreciated that although lines 58 and 70 are shown as extending only to one of cylinders 42, they are connected to both cylinders, by means not shown, since in the present embodiment the machine is designed so that both cutters work at the same time. However, if it is desired to have the cutters work alternately, then the above hydraulic circuitry would be doubled, with one set for each cylinder 42.

Heads of the cabbage are held in substantially vertical position on the upper flight of conveyor belt 12 by means of suitable cup members 78. These members provide a shallow retaining rim for releasably holding the cabbages in upright position as they move along the conveyor. As shown in FIG. 2, cups 78 are preferably located opposite each other so that a pair of cabbages move in unison along the conveyor to the coring station. Obviously, the cups could be arranged in staggered position, and as mentioned before, separate hydraulic circuitry provided for each cylinder.

In addition, although the present machine comprises only two coring devices and can core only two cabbages at a time, the machine could be made wider and a larger number of cabbages handled at the same time. In this case, additional hydraulic cylinders 42 and associated piston rods 40 and cutters 36 would be provided. Although the present means for actuating "down" valve 56 is shown as a series of cams 76 mounted on the upper surface of the upper flight of belt 12, the actuating means could also comprise notches cut into the edge of belt 12 if the belt were made of steel or similar material. Cams 76 are located so that the cutter will engage the core of the cabbage at the proper time. Since the cutter makes its up and down stroke in approximately one tenth of a second, it is not necessary to stop the belt during the cutting operation, and belt 12 continues to move at a uniform speed. Thus the cyclical speed of the cutter so exceeds the linear speed of conveyor belt 12 that belt 12 moves only a minute or incremental distance during a cycle of operation of the cutter. A cycle of operation starts when the cutter begins its downward movement in response to the closing of switch 56 and ends when the cutter returns to its fully raised position.

After the cutters retract, the cabbages move past the coring station to the discharge end of the machine where they pass on to suitable conveying means (not shown) or into receptacles for transfer to the conventional slicing machine which slices the cabbage prior to its being made into sauerkraut.

Thus, it will be seen that the present invention provides an efficient and safe machine for cutting the cores of cabbages without the use of dangerous rotating knives. In addition, it comprises few parts, is direct and straightforward in its construction and manner of operation, and will operate satisfactorily with little maintenance or adjustment. Moreover, by use of the present machine, the cores of the cabbages are usable for making sauerkraut and are no longer wasted. This greatly increases the yield of the sauerkraut operation, and provides a marked increase in output and efficiency of the sauerkraut.

Persons wishing to practice the invention should remember that other embodiment and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate that different means can be provided for holding the cabbage in position on the conveyor belt, the machine can be designed to accommodate more than two cabbages, the machine may be designed to operate on the advancing lines of cabbages alternately, and the details of the many variations that can be made in the machine and method of operating the same.

I claim:

1. A machine for cutting or sectioning the cores of leafy vegetables such as heads of cabbage or the like, said machine comprising:
   a. an elongated supporting frame having a feed end and a discharge end;
   b. conveying means mounted on said frame for continuous travel substantially along a first plane at a uniform linear speed from said feed end to said discharge end;
   c. retainer means on said conveying means for releasably holding said vegetables in positions with the cores thereof extending substantially perpendicular to said first plane;
   d. a stationary core cutting station through which said conveying means travels;
   e. core cutting means at said cutting station mounted for cyclical reciprocal movement in a second plane substantially perpendicular to said first plane for engaging and cutting the cores of said vegetables during continuous travel of said conveyor;

f. means for moving said cutting means in said second plane into engagement with said cores of said vegetables when said vegetables reach said cutting station, said moving means moving said cutting means at a cyclical speed relative to said continuous uniform linear speed such that said cutting means completes a core cutting operation before said conveying means has traveled more than an incremental distance whereby it is unnecessary to stop said conveying means during said core cutting operation; and g. means actuated by said cutting means when moved in the direction of engagement with said cores of said vegetables for withdrawing said cutting means in said second plane at the end of the core cutting operation without separating said vegetables into discrete portions whereby substantially all of said vegetables are retained for subsequent use.

2. The machine of claim 1 wherein said cutting means comprises non-rotating knife means.

3. The machine of claim 1 wherein the means for moving said cutting means into engagement with said cores of said vegetables comprises means actuated by the movement of said vegetables into said cutting station.